Patented Mar. 25, 1930

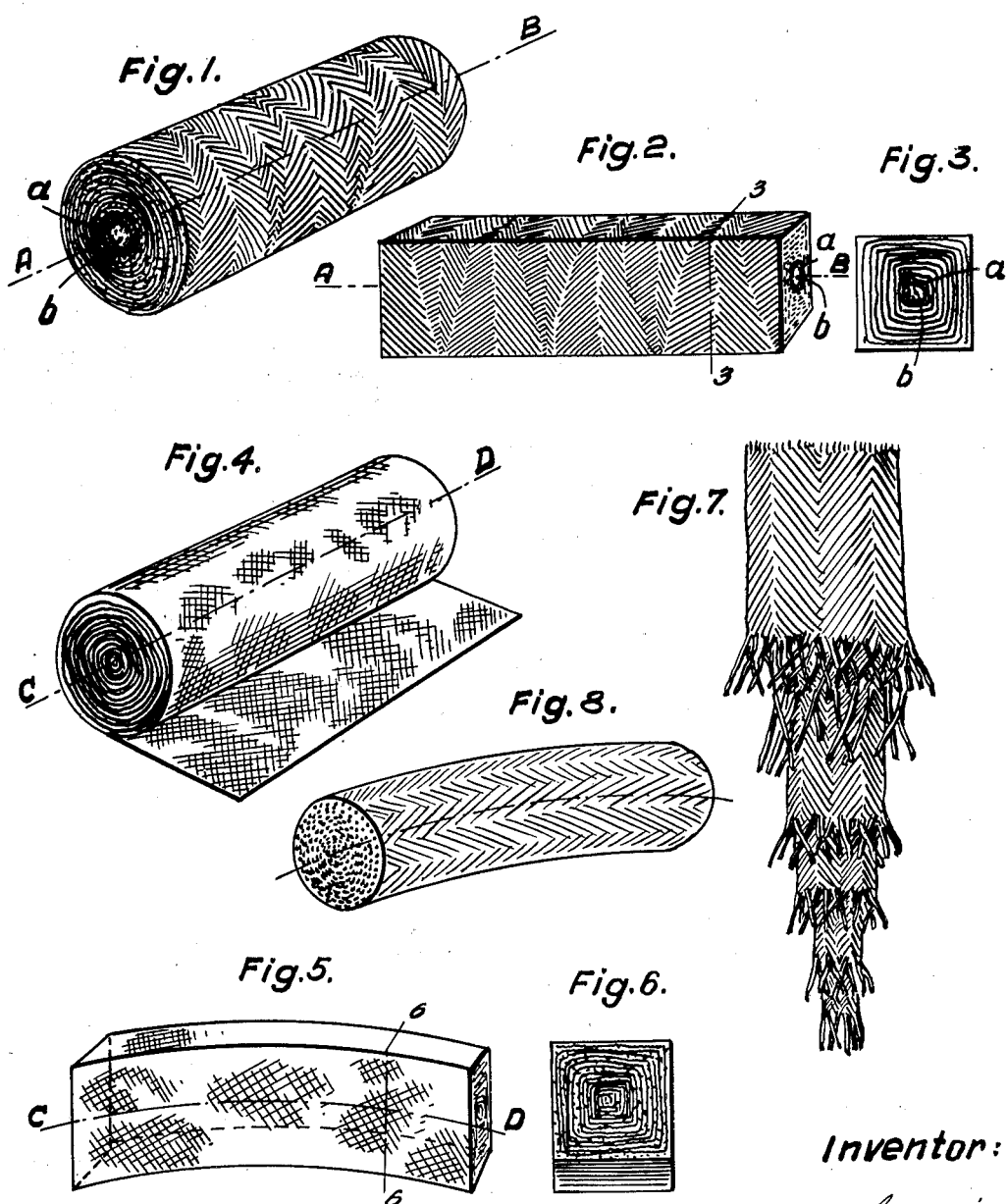

1,751,911

UNITED STATES PATENT OFFICE

HEINRICH CONSTANTIN GEORGI, OF BERLIN-ZEHLENDORF-WEST, GERMANY, ASSIGNOR TO DEUTSCHE ASBESTWERKE A.-G., OF BERLIN-ZEHLENDORF, GERMANY, A JOINT-STOCK COMPANY

BRAKE BLOCK

Application filed May 11, 1929, Serial No. 362,311, and in Germany November 30, 1927.

My invention relates to improvements in brake blocks and the method of manufacturing the same, and more particularly in brake blocks of the type composed of layers of fibrous material. The object of the improvements is to provide a brake block of this type in which the layers of the fibrous material form a coherent body, and with this object in view my invention consists in manufacturing a brake block in which such layers are continuously wound around the axis of the block.

For the purpose of explaining the invention several examples embodying the same have been shown in the accompanying drawing in which the same reference characters have been used in all the views to indicate corresponding parts. In said drawing, Fig. 1, is a perspective view showing a body of fibrous material manufactured in the manner of a cross-wound bobbin;

Fig. 2, is a similar perspective view showing the body illustrated in Fig. 1 after compression into the desired form of the brake block;

Fig. 3, is a sectional elevation taken on the line 3—3 of Fig. 2;

Fig. 4 is a perspective view showing a modification of the method of manufacturing a body of the character illustrated in Fig. 1;

Fig. 5, is a perspective view showing a brake block made from the body obtained by the method illustrated in Fig. 4;

Fig. 6, is a sectional elevation taken on the line 6—6 of Fig. 5;

Fig. 7, is an elevation illustrating another modification of manufacturing a body of fibrous material; and Fig. 8, is a perspective view showing a brake block made from the body illustrated in Fig. 7.

In the manufacture of the brake block I first make a body of fibrous material by winding the fibrous material in several layers on an axis corresponding to the longitudinal axis of the brake block to be manufactured, the said axis being rectilinear during the process of winding the material into a body. For thus winding fibrous material into a body I may proceed from threads of asbestos or other fibrous material which may or may not be reinforced by metal wire, and I wind the said thread into a body in the manner of a cross-wound bobbin. In a modification of the process I proceed from woven or non-woven ribbons, or I proceed from threads of asbestos or other fibrous material which may or may not be reinforced by metal wire and manufacture a body of circular or polygonal cross-section on a bobbin machine or on a braiding machine. The impregnation of the body may be effected while or after winding or braiding the same. After the body has thus been manufactured by a winding or braiding operation the final shape and the compactness are imparted thereto by pressure. If the body has been produced by the winding operation the desired length of the block is directly produced by pressing the body, and if the body has been obtained by a braiding operation it is necessary first to cut pieces of the desired length from the braided body. In both cases the final product is a rigid coherent block, because the threads pass all through the body of the block, and the block is not composed of superposed and independent layers.

Referring now to the figures in detail, Fig. 1 shows a body in the form of a cross-wound bobbin. The said bobbin comprises a core consisting of a sleeve $a$ of asbestos having a filling $b$ of asbestos, and threads of asbestos are wound thereon in the form of a cross-wound bobbin. The axis of the bobbin has been indicated by the line A—B. In Fig. 2 I have shown a brake block produced by pressing the body shown in Fig. 1 into the desired form, the said block being rectangular in cross-section. The pressure has been applied from opposite sides of the axis A—B. I wish it to be understood that the body may be pressed into other forms. If a block of curved form is desired the body is pressed accordingly so that its axis A—B is curved. The threads of the bobbin may be reinforced by metal wire, and they may consist of any suitable fibrous material.

In a modification of the method I start from a fabric. For example woven ribbons or felt ribbons made from asbestos which is or is not reinforced by metal wire, and having a breadth corresponding to the desired length of the brake block, are wound under pressure into a coil, the margins of the superposed layers of the ribbon being located one above the other. Thus a cylindrical body is obtained, the diameter of which depends on the desired circumference of the block. The body is wound on an axis corresponding to the longitudinal axis of the block. The said coils are impregnated either during or after winding the same, and they are brought into the desired shape and hardened by hydraulic pressure. Also in this case the desired shape and rigidity can be applied to the body by very high pressure, in which case impregnation may be dispensed with.

The method has been illustrated in Fig. 4 showing a coil of woven ribbon, C—D being the axis of the coil. In Figs. 5 and 6 I have shown the coil which may or may not be impregnated in the final shape of the brake block imparted thereto by hydraulic pressure. As shown, the brake block is slightly curved, its longitudinal axis C—D being arc-shaped. The cross-section shows the texture of the block and it shows the warp threads in cross-section.

Finally, by means of known bobbin machines or braiding machines threads of asbestos with or without reinforcing wires may be braided within the impregnating material, so that the body is impregnated in a reliable way. By producing several layers of braiding I obtain a body of cylindrical or square cross-section of any desired thickness. Thus also in this case the body is gradually developed around its axis. From the braided body suitable lengths are cut according to the desired length of the brake block, and the said pieces are brought into final shape by hydraulic pressure. Also in this case the body is built up from the axis outwardly.

It will be understood that a core similar to the core as shown in Fig. 1 may be enclosed within the braided material if desired, the successive braided sheets completely surrounding this core.

The method has been illustrated in Fig. 7 showing a body consisting of several concentric layers of braided fabric. From the body shown in Fig. 7 a piece of the desired length is cut and pressed. Fig. 8 shows a piece of circular cross-section which has been pressed, and which has a curved axis. The curved longitudinal axis E—F of the block corresponds to the longitudinal axis of the body shown in Fig. 7.

While in describing the invention reference has been made to particular examples embodying the same I wish it to be understood that my invention is not limited to the methods and forms described herein and shown in the accompanying drawing.

Having thus described the invention, what is claimed as new and desired to be secured by Letters Patent is:

1. A fibrous brake block having a central core and a surrounding body of compressed fibrous material, the fibers in the body extending generally in a direction angularly with respect to the axis of the core.

2. A fibrous brake block having a central tubular core of asbestos having asbestos fibers therein, and a surrounding body of compressed asbestos of substantially rectangular cross section, the fibers in the body extending generally in a direction angularly with respect to the axis of the core.

3. A fibrous brake block having a central tubular core of fibrous material and a highly compressed surrounding body of substantially rectangular cross section consisting of a succession of encasing sheaths of braided fibrous material, each sheath completely surrounding the core and the sheaths encased thereby.

4. A brake block consisting of a fibrous core and a series of independent coaxial sheaths surrounding said core and compressed thereon to form a rigid and substantially homogeneous element.

5. A brake block consisting of a fibrous core and a series of independent coaxial sheaths surrounding said core and compressed thereon to form a rigid and substantially homogeneous element, each sheath consisting of woven fibrous strands extending in a direction substantially angularly with respect to the axis of the core.

In testimony whereof I hereunto affix my signature.

HEINRICH CONSTANTIN GEORGI.